(12) United States Patent
Rothkugel (10) Patent No.: US 7,404,578 B2
(45) Date of Patent: Jul. 29, 2008

(54) SECURING DEVICE FOR A SEATBELT (75) Inventor: Armin Rothkugel, Ulm (DE)

(73) Assignee: Takata-Petri (Ulm) GmbH, Ulm (DE)

( * ) Notice: Subject to any disclaimer, the term of this patent is extended or adjusted under 35 U.S.C. 154(b) by 122 days.

(21) Appl. No.: 11/207,805

(22) Filed: Aug. 22, 2005

(65) Prior Publication Data
US 2006/0043723 A1 Mar. 2, 2006

(30) Foreign Application Priority Data
Aug. 24, 2004 (DE) .................. 10 2004 041 109

(51) Int. Cl.
*B60R 22/00* (2006.01)
(52) U.S. Cl. .................. 280/801.1; 24/665; 24/672
(58) Field of Classification Search .............. 280/801.1, 280/801.2, 808; 24/579.11, 625, 628, 664, 24/665, 671, 672
See application file for complete search history.

(56) References Cited

U.S. PATENT DOCUMENTS

| | | | | |
|---|---|---|---|---|
| 1,737,246 A | * | 11/1929 | Jones | 24/616 |
| 3,200,461 A | | 8/1965 | Miller | |
| 3,716,895 A | * | 2/1973 | Fohr | 24/664 |
| 4,181,832 A | | 1/1980 | Ueda | |
| 4,194,764 A | * | 3/1980 | Grimm | 280/801.1 |
| 4,228,567 A | * | 10/1980 | Ikesue et al. | 24/642 |
| 4,369,553 A | * | 1/1983 | Yuda | 24/618 |
| 4,408,375 A | * | 10/1983 | Skobel | 24/615 |
| 4,559,679 A | * | 12/1985 | Downey | 24/615 |
| 4,567,629 A | | 2/1986 | Tanaka | |
| 4,577,377 A | * | 3/1986 | Kasai | 24/625 |
| 4,588,207 A | * | 5/1986 | Doty | 280/801.1 |
| 4,713,865 A | * | 12/1987 | Geldwerth | 24/616 |
| 4,742,886 A | * | 5/1988 | Sato | 180/268 |
| 4,813,108 A | * | 3/1989 | Geldwerth | 24/616 |
| 5,617,617 A | * | 4/1997 | Gustin | 24/633 |
| 5,704,099 A | | 1/1998 | Cahill | |
| 5,890,497 A | * | 4/1999 | Tsai | 132/273 |
| 5,996,421 A | * | 12/1999 | Husby | 73/862.451 |
| 2003/0071453 A1 | | 4/2003 | Holzapfel | |

FOREIGN PATENT DOCUMENTS

| | | |
|---|---|---|
| DE | 7 29 523 | 11/1942 |
| DE | 28 14 335 A1 | 10/1978 |
| DE | 76 14 141 U1 | 1/1982 |
| DE | 31 35 456 A1 | 3/1983 |
| DE | 37 07 464 A1 | 10/1987 |
| DE | 38 11 429 A1 | 10/1989 |
| DE | 295 15 686 U1 | 11/1995 |

(Continued)

*Primary Examiner*—Ruth Ilan
*Assistant Examiner*—Leonard McCreary, Jr.
(74) *Attorney, Agent, or Firm*—Foley & Lardner LLP (57) ABSTRACT

A securing device for a seatbelt, in particular a motor vehicle seatbelt, includes a receiving device for receiving a plug-in element and a locking device for retaining the plug-in element in the receiving device for the purpose of securing the seatbelt. The securing device, which can be manufactured in a particularly simple manner, enjoys reduced production costs. The locking device reduces manufacturing costs by being formed exclusively of a single-part closure spring that is secured in or on the receiving device.

19 Claims, 5 Drawing Sheets

FOREIGN PATENT DOCUMENTS

| | | |
|---|---|---|
| DE | 196 41 226 A1 | 5/1997 |
| DE | 298 14 685 U1 | 1/1999 |
| DE | 698 16 823 T2 | 1/1999 |
| DE | 201 16 939 U1 | 4/2002 |
| GB | 2 189 540 A | 10/1987 |
| JP | S59-123408 | 8/1984 |
| WO | WO 97/02767 | 1/1997 |
| WO | WO 99/01318 | 1/1999 |

* cited by examiner

SECURING DEVICE FOR A SEATBELT

BACKGROUND

The present invention relates to a securing device for a seatbelt. In particular, the present invention relates to a securing device for a seatbelt of a motor vehicle.

German Utility Model DE 201 16 939 U1 (incorporated by reference herein) discloses a securing device that is an end fitting lock with which one end of a seatbelt is permanently secured to a vehicle chassis. The securing device of DE 201 16 939 U1 has a receiving device into which a plug-in element is introduced and retained therein, for the purpose of securing the seatbelt. To retain the plug-in element in the receiving device, a locking device is provided with which the introduced plug-in element is permanently locked. The locking device contains a scissor-shaped device that is held under prestress with a separate spring. As a result of the large number of parts (and their complexity) needed to manufacture the aforementioned securing device, the production and installation costs thereof are undesirably high.

Accordingly, the present invention has been made in light of the aforementioned problem. Specifically, an object of the present invention is to provide a securing device that can be manufactured in a particularly simple manner, thereby lowering production costs. Another object of the present invention is to provide a securing device that can be readily installed in a vehicle, thereby lowering installation costs.

SUMMARY

An embodiment of the invention addresses a seatbelt securing device that is configured to engage a plug-in element. The securing device includes, among other possible things: (a) a receiving device for receiving the plug-in element; and (b) a locking device for retaining the plug-in element in the receiving device to secure the seatbelt. The locking device is formed exclusively by a single-part closure spring that is secured in or on the receiving device.

In another embodiment of the securing device, the receiving device may be of single-part design.

In another embodiment of the securing device, the securing device may be formed exclusively by two parts, namely the single-part receiving device and the single-part closure spring.

In another embodiment of the securing device, the closure spring may be formed by a spring plate that is bent apart when the plug-in element is inserted into the receiving device.

In another embodiment of the securing device, the receiving device may be formed by a single part that is punched and bent.

In another embodiment of the securing device, the securing device may form an end fitting lock for securing one end of the seatbelt on a vehicle chassis.

In another embodiment of the securing device, the plug-in element may be secured on the vehicle chassis at one end of the seatbelt and one end of the end fitting lock. Further, an end fitting tightener may be provided between the end fitting lock and the vehicle chassis. Additionally or alternatively, the securing device may be secured on the seatbelt and the plug-in element may be secured on the vehicle chassis. Further, an end fitting tightener may be provided between the plug-in element and the vehicle chassis.

In another embodiment of the securing device, the closure spring may be U-shaped in cross-section such that the closure spring has a bottom region and two side regions. Further, the bottom region of the closure spring may form a stop for the plug-in element. Further, each of the side regions may have a recess into which a latching element of the plug-in element latches for locking purposes.

In another embodiment of the securing device, the plug-in element may have a lug-shaped cam that, in the locked position of the plug-in element, may rest on the bottom region of the U-shaped closure spring.

In another embodiment of the securing device, the lug-shaped cam, in the locked position of the plug-in element, may press the bottom region of the U-shaped closure spring in such a manner that the two side regions of the closure spring are pressed against side flanks of the plug-in element.

In another embodiment of the securing device, at least one of the latching elements of the plug-in element may be formed by a side flank region that includes a serrated region and an adjacent latching recess.

In another embodiment of the securing device, each of the latching recesses may have two latching edges that are substantially parallel to each other and substantially perpendicular to the side flanks.

In another embodiment of the securing device, each of the latching recesses may have a latching bottom that may be substantially perpendicular to the two substantially parallel latching edges and may be substantially parallel to an insertion direction of the plug-in element.

In another embodiment of the securing device, the U-shaped closure spring may be clamped between at least one U-shaped, in cross-section, support element and a corresponding support element that extends in a direction that is substantially perpendicular to the insertion direction.

In another embodiment of the securing device, the cross-sectional plane in which the U-shaped support element is U-shaped may be substantially perpendicular to the bottom region of the U-shaped closure spring.

In another embodiment of the securing device, the latching recesses and/or the recesses of the closure spring may form a means of securing against rotation.

In another embodiment of the securing device, the latching recesses of the means of securing against rotation may be of different sizes and/or provided at different vertical heights on the plug-in element.

In another embodiment of the securing device, the recesses of the closure spring of the means of securing against rotation may be of different sizes and/or provided at different vertical heights on the closure spring.

In contrast to the securing device of DE 201 16 939 U1, which has a locking device formed by a total of three parts (i.e., the two components of the scissor-shaped device and the separate spring), the locking device according to the invention uses just a single element to attain the same functionality. In other words, the present invention enables the locking device to be formed exclusively by a single-part closure spring that is secured in or on the receiving device. As a result, a substantial advantage of the locking device according to the present invention is that it can be manufactured very simply and cost-effectively.

In some embodiments, the receiving device may also be of single-part design. This design is particularly advantageous because the production costs are further reduced. As a result, the securing device may have only two parts, namely the single-part receiving device and the single-part closure spring. Further, the single-part closure spring may be simply and, therefore, advantageously formed by a spring plate that is bent apart when the plug-in element is fitted. Further still, the receiving device may be formed by a single part that is punched and bent and that can be manufactured very cost-effectively. Moreover, as a result of the simple design of the securing device according to the present invention, the securing device can be readily installed in, e.g., a motor vehicle, thereby reducing installation costs The securing device may be used as an end fitting lock for permanently securing one end of a seatbelt to the vehicle chassis of a vehicle. In this connection, the plug-in element may be secured at one end of the seatbelt and the end fitting lock can be secured indirectly or directly to the vehicle chassis. Moreover, an end fitting tightener may additionally be arranged between the end fitting lock and the vehicle chassis and may be used to tighten the seatbelt in the event of an accident.

In some embodiments, the function of the lug-shaped cam may be to bring about a particularly secure locking of the plug-in element by those side regions of the closure spring that cause the latching to be securely and permanently pressed against the side flanks of the plug-in element, after locking has taken place. An unintentional release of the plug-in element from the receiving device may, therefore, be reliably avoided. Further, the securing device may be designed in such a manner that a release of the locking of the plug-in element from the outside is possible only with the aid of a tool, i.e., an unintentional release of the seatbelt may further be reliably avoided.

The U-shaped closure spring may be clamped on or in the receiving device between at least one U-shaped support element and a support element that is bent essentially perpendicular with respect to the insertion direction of the plug-in element. This advantageously lowers the production costs during the installation of the closure spring in the receiving device, as no further securing steps are required after the closure spring has been "clamped in".

It is possible to accommodate the securing device in a separate housing. As a result, the access to the closure spring (e.g., to release the closure spring) may then occur via at least one opening hole in the housing.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Embodiments of the present invention will be described with reference to the drawings. Like numbers are used throughout the drawings to refer to the same or similar parts and in each of the embodiments of the invention hereafter described.

Figure 1:
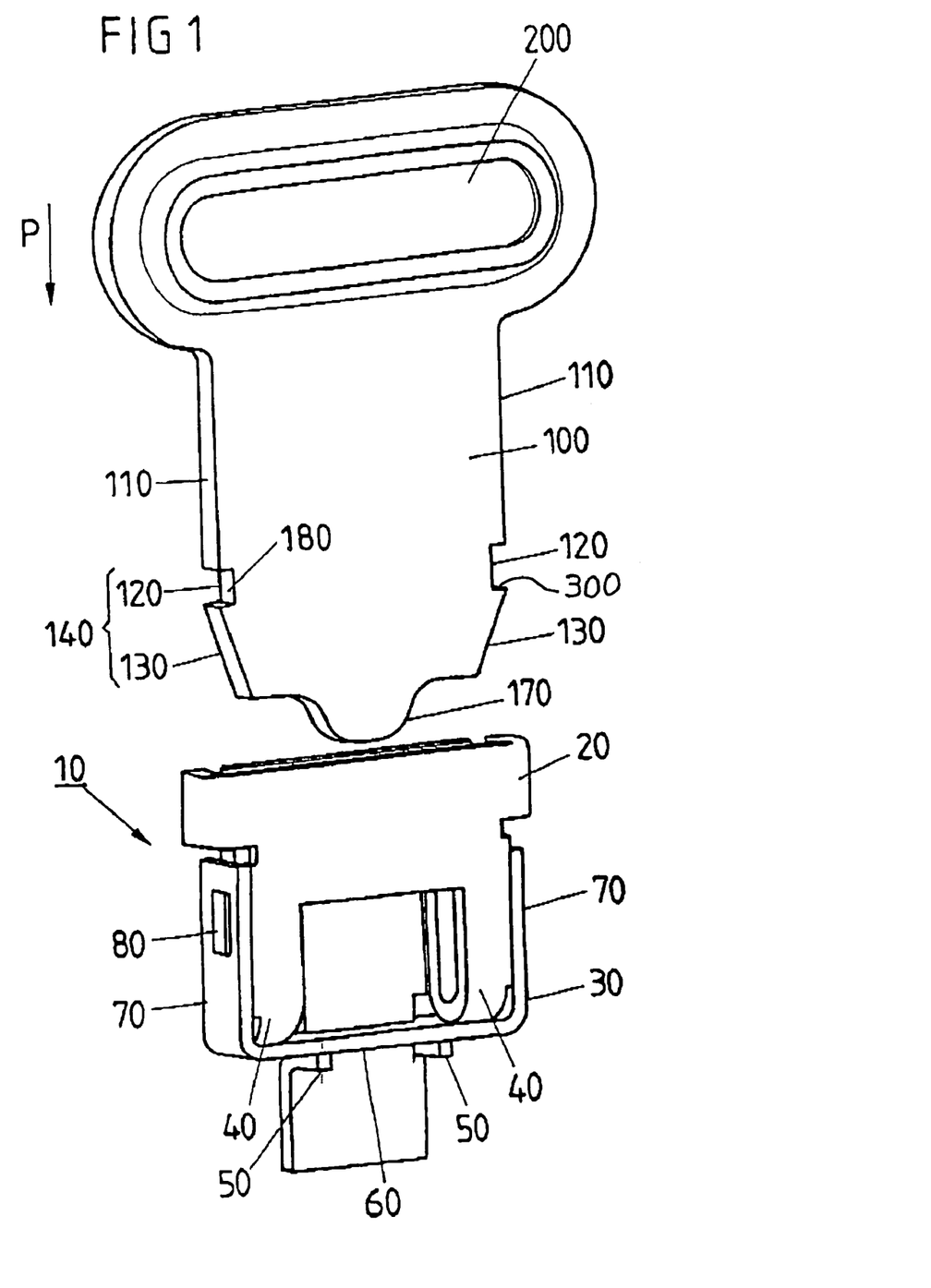
FIG. 1 is a perspective view that shows an exemplary embodiment of a plug-in element that is configured to engage a corresponding securing device that includes a receiving device and a closure spring.

FIG. 1 shows a securing device in the form of an end fitting lock 10 that is used for permanently securing one end of a seatbelt (not illustrated in FIG. 1 for reasons of clarity) to a vehicle chassis. The end fitting lock 10 has a receiving device 20 that is formed by a single-part that is punched and bent. A closure spring 30, which is U-shaped in cross-section and formed by a spring plate, is clamped on the receiving device 20.

To secure the closure spring 30 on the receiving device 20, the receiving device 20 has support elements 40 that are U-shaped in cross-section. Each of the support elements 40 is associated with a corresponding angled support element 50. A bottom region 60 of the U-shaped closure spring 30 is securely clamped between the two U-shaped support elements 40 and the two angled support elements 50.

As can be seen in FIG. 1, the U-shaped closure spring 30 has two parallel side regions 70. Each of the parallel side regions 70 includes a recess 80 (only one of which is shown in FIG. 1); the recesses 80 are used to lock a plug-in element 100 that is inserted into the receiving device 20. The plug-in element 100 is provided with two parallel side flanks 110, each of which includes a latching recess 120 and a serrated side flank region 130. A pair of one latching recess 120 and one serrated side flank region 130 defines a latching element 140. The latching elements 140, which are on the insertion end of the plug-in element 100, interact with the two recesses 80 of the closure spring 30. This interaction is later explained with respect to FIGS. 2 to 5.

It should be readily recognized that the two latching recesses 120 may differ in size and/or location on the side flanks 110. As a result, the plug-in element 100 may be locked only in a predetermined, relative position in the receiving device 20. A poka-yoke securing means (i.e., a means of securing against rotation) may, therefore, be realized, thereby preventing the seatbelt from undesirably rotating through 180°. For this purpose, the recesses 80 of the closure spring 30 may be dimensioned to correspond to the different recesses 120 of the side flanks 110, e.g., one of the recesses 80 may be smaller than the other recess 80 and/or may be arranged at a different vertical height on the closure spring 30.

As can be seen in FIG. 1, the plug-in element 100 is equipped with a lug-shaped cam 170, which is arranged at the front in the insertion direction P. When the plug-in element 100 is inserted, the two side regions 70 of the U-shaped closure spring 30 are pressed apart by the serrated side flank regions 130 until the plug-in element 100 finally latches completely into the recesses 80.

To secure the seatbelt to the vehicle chassis, the seatbelt is secured to a securing region 200 of the plug-in element 100, which securing region 200 is oval in cross-section. The plug-in element 100 is, of course, engaged with the end fitting lock 10, which, in turn, is fastened indirectly or directly to the vehicle chassis.

Figure 2:
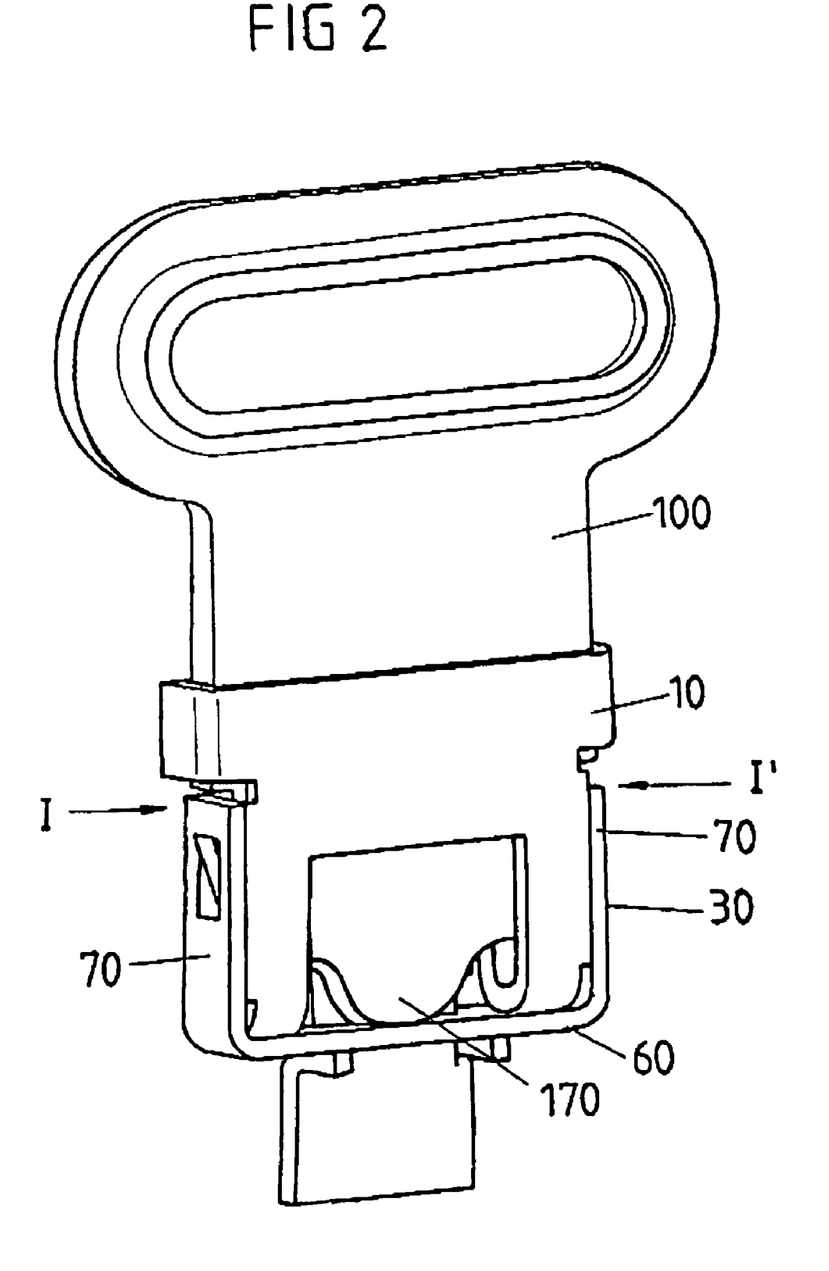
FIG. 2 is a perspective view of the plug-in element introduced into the receiving device.

FIG. 2 is a perspective view of the plug-in element 100 introduced into the end fitting lock 10. It can be seen that the lug-shaped cam 170 of the plug-in element 100 rests on the bottom region 60 of the U-shaped closure spring 30 and presses the bottom region 60 downward in the insertion direction P. As a result, the side regions 70 of the U-shaped closure spring 30 are respectively pressed inward in the direction of arrows I and I'.

It can furthermore be seen in FIG. 2 that the latching elements 140, which are formed by the latching recesses 120 and the saw tooth-shaped side flank regions 130, are respectively latched into associated recesses 80 in the side regions 70 of the U-shaped closure spring 30. For this purpose, latching edges 300 of the latching recesses 120, which are adjacent the associated serrated side flank regions 130, bear directly against edge regions of the recesses 80 of the U-shaped closure spring 30. Each of the latching recesses 120 also includes a latching bottom 180 (shown in FIG. 1) that is substantially perpendicular to the associated latching edge 300 and parallel to the insertion direction P of the plug-in element 100. The plug-in element 100 is, therefore, fixedly latched in the closure spring 30 and, in turn, is fixedly received in the receiving device 20.

In addition, the U-shaped closure spring 30 is also likewise firmly fixed on the receiving device 20 by means of the lug-shaped cam 170. Specifically, the pressure of the lug-shaped cam 170 acting on the bottom region 60 of the closure spring 30 results in the bottom region 60 being firmly clamped between the U-shaped support elements 40 and the angled support elements 50 of the receiving device 20.

Figure 3:
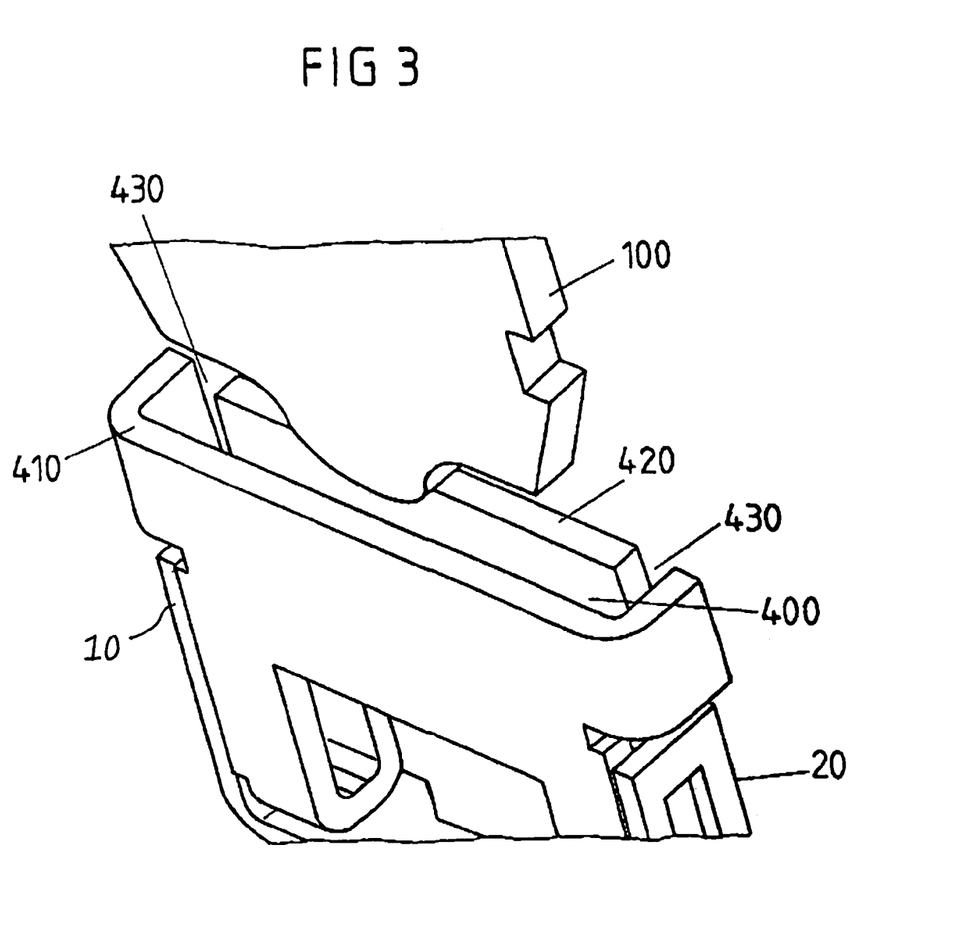
FIG. 3 is a cut-away perspective view that shows a top side of the securing device before the plug-in element is introduced in the receiving device.

FIG. 3 shows a top view of the end fitting lock 10 and the plug-in element 100, before the plug-in element 100 is inserted in the receiving device 20. As shown, a rectangular (in cross-section) receiving region 400 of the receiving device 20 is formed by two receiving-part elements 410 and 420. One of the two receiving-part elements 410 is U-shaped in cross-section. The other of the two receiving-part elements 420 is formed by a transverse web that lies opposite and parallel to the bottom region of the U-shaped receiving-part element 410. At the receiving region end, the two receiving-part elements 410 and 420 are separated from each other by two slots 430. The two slots 430 are present because of the production process, i.e., as previously explained, the receiving device 20 is formed of single part that is punched and bent.

Figure 4:
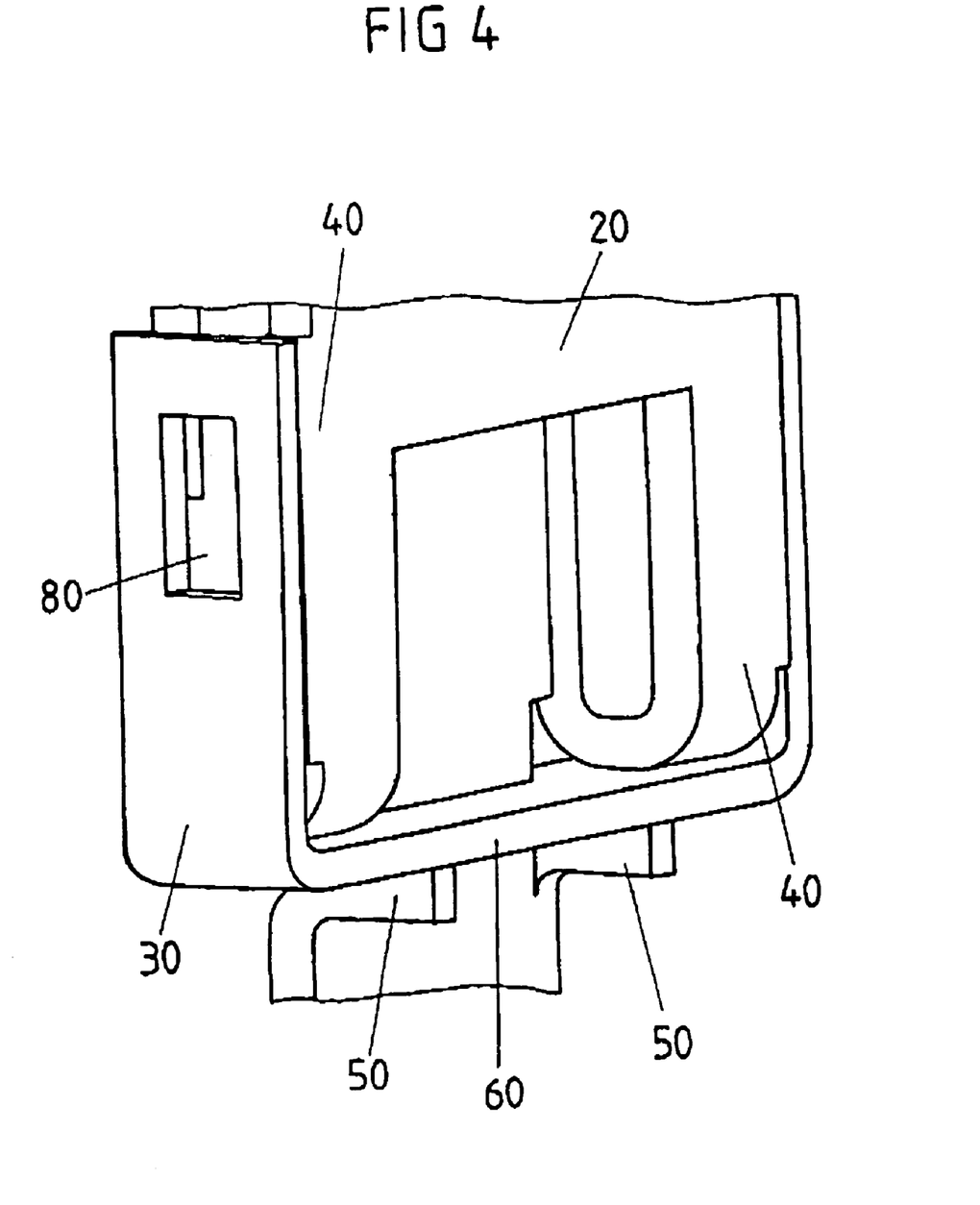
FIG. 4 is a cut-away perspective view that shows the securing of the closure spring of the securing device.
Figure 5:
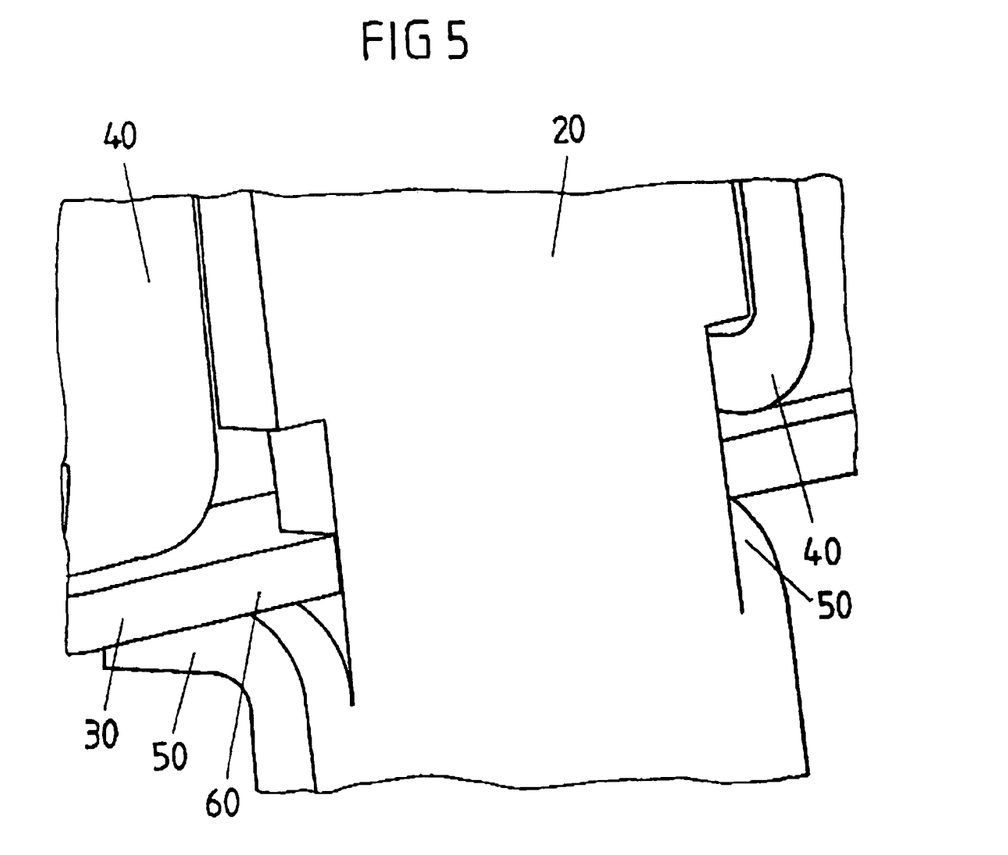
FIG. 5 is another cut-away perspective view that shows the securing of the closure spring of the securing device.

FIGS. 4 and 5 illustrate the securing of the closure spring 30 on the receiving device 20. It can be seen that the bottom region 60 of the U-shaped closure spring 30 is securely clamped between the two angled support elements 50 and the two U-shaped support elements 40. To secure the closure spring 30 on the receiving device 20, the closure spring 30 merely has to be pushed between the two U-shaped support elements 40 and the two angled support elements 50.

In the case of the exemplary embodiment according to FIGS. 1 to 5, the seatbelt is secured in the oval securing region 400 of the plug-in element 100 and the receiving device 20 is secured to the vehicle chassis. Of course, the securing arrangement could be reversed, i.e., so that the end fitting lock 10 is secured to the seatbelt and the plug-in element 100 is secured to the vehicle chassis.

The priority application, German Application No. 10 2004 041 109.3, which was filed on Aug. 24, 2004, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure that are within the scope and spirit of the present invention are to be included as further embodiments of the present invention. The scope of the present invention is to be defined as set forth in the following claims.

What is claimed is:

1. A seatbelt securing device configured to engage a plug-in element comprising:
a receiving device for receiving the plug-in element; and
a locking device for retaining the plug-in element in the receiving device to secure the seatbelt,
wherein the locking device is formed exclusively by a single-part closure spring that is secured in or on the receiving device,
wherein the closure spring has a U-shaped cross-section such that the closure spring has a bottom region and two side regions, and
wherein the bottom region of the closure spring forms a stop for the plug-in element.

2. The securing device of claim 1, wherein the receiving device is of single-part design.

3. The securing device of claim 1, wherein the securing device is formed exclusively by two parts, namely the single-part receiving device and the single-part closure spring.

4. The securing device of claim 1, wherein the closure spring is formed by a spring plate that is bent apart when the plug-in element is inserted into the receiving device.

5. The securing device of claim 1, wherein the receiving device is formed by a single part that is punched and bent.

6. The securing device of claim 1, wherein the securing device forms an end fitting lock for securing one end of the seatbelt on a vehicle chassis.

7. The securing device of claim 6, wherein the plug-in element is configured to be secured at one end of the seatbelt and the end fitting lock is configured to be indirectly or directly secured to the vehicle chassis.

8. The securing device of claim 6, wherein the securing device is configured to be indirectly or directly secured on the vehicle chassis and the plug-in element is configured to be secured at one end of the seatbelt.

9. The securing device of claim 1, wherein each of the side regions of the closure spring has a recess into which a latching element of the plug-in element latches for locking purposes.

10. The securing device of claim 9, wherein the plug-in element has a lug that, in the locked position of the plug-in element, rests on the bottom region of the U-shaped closure spring.

11. The securing device of claim 10, wherein the lug, in the locked position of the plug-in element, presses the bottom region of the U-shaped closure spring in such a manner that the two side regions of the closure spring are pressed against side flanks of the plug-in element.

12. The securing device of claim 11, wherein each of the latching elements of the plug-in element is formed by a side flank region that includes a serrated region and an adjacent latching recess.

13. The securing device of claim 12, wherein each of the latching recesses has two latching edges that are substantially parallel to each other and substantially perpendicular to the side flanks.

14. The securing device of claim 13, wherein each of the latching recesses has a latching bottom that is substantially perpendicular to the two substantially parallel latching edges and is substantially parallel to an insertion direction of the plug-in element.

15. The securing device of claim 14, wherein the U-shaped closure spring is clamped between at least one U-shaped, in cross-section, support element and a corresponding support element that extends in a direction that is substantially perpendicular to the insertion direction.

16. The securing device of claim 15, wherein the cross-sectional plane in which the U-shaped support element is U-shaped is substantially perpendicular to the bottom region of the U-shaped closure spring.

17. The securing device of claim 12, wherein the latching recesses and/or the recesses of the closure spring form a means of securing against rotation.

18. The securing device of claim 17, wherein the latching recesses of the means of securing against rotation are of different sizes and/or provided at different vertical heights on the plug-in element.

19. The securing device of claim 17, wherein the recesses of the closure spring of the means of securing against rotation are of different sizes and/or provided at different vertical heights on the closure spring.

* * * * *